July 26, 1955   J. W. ANDERSEN   2,713,793
BIN-LEVEL INDICATOR
Filed May 5, 1952

INVENTOR.
JOHN W. ANDERSEN
BY
ATTORNEY.

United States Patent Office 2,713,793
Patented July 26, 1955

2,713,793

BIN-LEVEL INDICATOR

John W. Andersen, Dayton, Ohio, assignor, by mesne assignments to The Chemstrand Corporation, a corporation of Delaware Application May 5, 1952, Serial No. 286,191

6 Claims. (Cl. 73—301)

This invention relates to a measuring apparatus and more particularly to an apparatus for measuring the level of a granular material stored in a bin, tank, silo, or like container. Specifically the invention is concerned with an apparatus which is capable of indicating in an essentially continuous fashion the changes in level in a bin containing a powdered material.

While the present invention is applicable in determining the level of any powdered or granular material in a bin, or the like, for example, such materials as sand, flour, synthetic plastic materials, etc., for purposes of simplicity of description the invention will be described as it is applicable in determining the level of a polymeric powder in a bin, and particularly polymers of acrylonitrile. It is to be understood that this is merely intended in an illustrative sense and the invention should not be limited thereby but only insofar as the same may be limited by the appended claims.

Various devices or apparatus are known for measuring or indicating the level or depth of granular material stored in bins, tanks, and like containers. These devices, however, leave much to be desired, particularly when the granular material is of such a nature that the same must be stored in sealed containers out of contact with the atmosphere, for example, a finely powdered organic material. Various organic materials will deteriorate upon exposure to air and many are inflammable or explosive under certain conditions, particularly when in a finely divided state. This is particularly true of acrylonitrile polymeric materials used in the manufacture of synthetic fibers, films, and/or the like. The various known apparatus which are designed for measuring volume of liquids in tanks, cannot be employed satisfactorily to measure the volume or depth of granular materials since the granular material does not possess the fluidity of liquids. Those level indicators which are of a mechanical nature are not entirely satisfactory when employed with a fine granular material since there is danger of the moving parts of the apparatus becoming clogged or contaminated by the fine granules.

It is an object of the present invention to provide an apparatus for measuring the level of a granular material stored in a bin, tank, or like container, which is capable of indicating the changes in level in the container of the granular or powdered material in an essentially continuous manner. It is a further object of the invention to provide an electrical apparatus for indicating the level or depth of granular or powdered material in a bin or the like which is simple and inexpensive in construction, capable of operation with low voltage current, and easily and readily installed in existing containers. Other objects and advantages of the present invention will be apparent from the description thereof hereinafter.

In general the objects of the present invention are accomplished by inserting into the container of powdered material a resistor and a series of connected contactors positioned adjacent thereto. As the powdered material comes in contact with the contactors the same are caused to contact the resistor due to the lateral pressure of the powdered material thus causing that portion of the resistor below the level of the granular material to be shorted out, that is, the electrical current takes the course of least resistance and flows through the connected contactors below the surface of the powdered material and then through the uppermost contactor, which is in contact with the resistor, and then through the resistor above the level of the powdered material. This changes the amount of resistance in the resistor which is thus recorded on a calibrated voltmeter. This reading is proportional to the depth of the material in the bin or container.

In measuring the depth of granular synthetic resinous material, such as an acrylonitrile polymer or copolymer, it is to be understood that such material is in an extremely fluid state and the angle of repose on the level of the material is practically negligible, thus requiring very little correction when the exact volume is to be determined. The angle of repose will of course vary with different materials but such angle is readily determinable and can be compensated for in determining volume by means of the present apparatus by anyone skilled in the art.

In order to more clearly understand the following detailed description of the invention, reference should be had to the accompanying drawing which depicts a preferred embodiment of the invention and in which, Figure 1 is a sectional diagrammatic elevation view of a tank containing a powdered material and showing one embodiment of the invention enlarged with respect to the tank and inserted therein;

Figure 1:
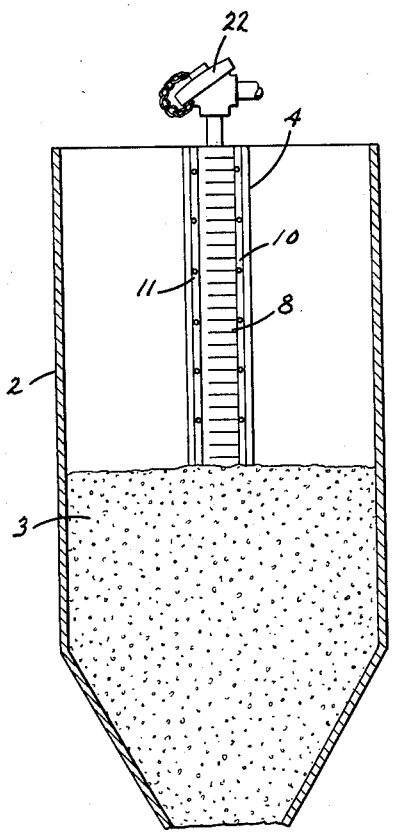
Figure 2:
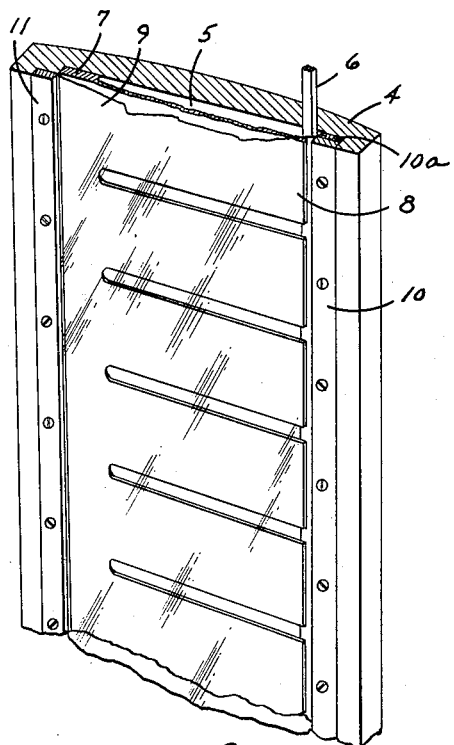
Figure 2 is an enlarged perspective view of a portion of the apparatus shown in Figure 1.

Referring to all of the figures of the drawing there is shown a tank 2 having a finely divided polymeric material 3 therein. Extending into the powdered material 3 is a backing member or support 4. While for purposes of description a backing member or support is indicated, this support 4 may constitute the wall of the tank or bin 2, or a portion thereof, or the support may be welded, or otherwise fastened to the inner surface of the bin wall. Of course, a separate means or support 4 must be employed when the indicating device is positioned in the center of the bin 2, or in any other position thereof other than adjacent the wall of the bin.

The support 4 has a cut-out portion or recess 5 on the inner face thereof in which is mounted the resistor strip or rod 6. The resistor strip 6 is preferably a nichrome strip, although the same may comprise a series of resistors with button contacts. When employing a six volt power supply, a strip having a resistance of one M ohm is satisfactory. In the opposite end of the cut-out portion 5 there is mounted a contactor strip 7 which has a series of leaf spring contactors 8 extending outwardly therefrom, the outer ends of which are positioned above or adjacent to the resistor strip 6. Normally, the leaf spring contactors 8 are out of contact with the strip 6. While the leaf spring contactors may be of any desired length, preferably they are two inches long, one inch wide, and approximately 0.005 inch thick, a brass shim stock being satisfactory. It is to be understood that the leaf spring contactors may be of any desired size depending upon the size of the bin or tank, the material contained therein, and the degree of accuracy desired in measuring the depth or level of the powdered or granular material.

Positioned over the strip of spring leaf contactors and resistor strip is a film of insulating material 9 held in position by means of the members or rods 10 and 11 which are fastened to the support 4 by any suitable means, such as screws and/or the like. It is to be understood that the film 9 must be of flexible material in order that the leaf spring contactors 8 may be moved by the lateral pressure of the powdered material 3. Any suitable film forming material may be employed, such as polythene, Kel-F (polychlorofluoride material), regenerated cellulose, and the like. In instances where electrostatic charges on the film are important or likely, a material which is very slightly electrically conductive i. e., a relatively non-conductive film-forming material, may be used to slowly dissipate the electrical charge. Preferably the film is formed from a non-fibrous material.

In the operation of the device of the present invention, it is desirable, particularly when employing a film 9 of non-fibrous material, to provide a breathing means between the space underneath the film and the tank volume in order to maintain an equilibrium in the pressure. This may be provided for in several ways, for example, a strip of felt or like porous material 10a may be inserted underneath member 10 between the film 9 and the support 4. Of course the felt strip may be placed under the member 11 rather than member 10, or both, if desired. Further, it is to be understood that the members 10 and/or 11 are not fastened so tightly as to form a gasket with the felt. The members are fastened so as to allow air or inert gas to pass through the felt to the tank volume or interior of the tank or bin. The felt acts as a solids filter, preventing the granules from coming into contact with the leaf spring contactors while at the same time allowing air or inert gas which may be present, such as nitrogen and the like, to pass therethrough, thus maintaining an equilibrium in the film 9 and the tank volume.

Figure 4:
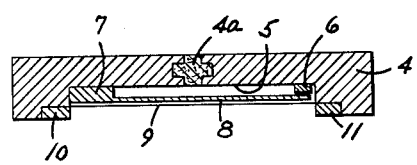
Figure 4 is a cross-section of the indicating device showing another embodiment of the invention.

The means described above is satisfactory when the support 4 is attached to the wall of the bin or tank or is a portion of the wall thereof. When the indicator is positioned in the center of the bin or tank, or in any portion other than adjacent the wall thereof, a means, such as shown in Figure 4 may be employed. In this embodiment a plug 4a of felt or like material is inserted in the support 4 between the recess 5 and the inside of the tank 2. The plug 4a need not extend the whole length of the support 4. As previously pointed out, the purpose of the felts is to prevent the entrapment of the gas in the space or recess 5 as the solid material in the bin or tank presses on the film 9. Any other suitable breathing means may be employed if desired.

Figure 3:
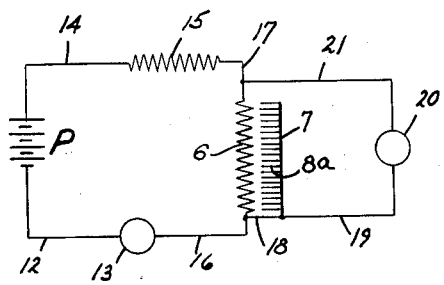
Figure 3 is a diagrammatic view of the electrical circuit employed in the present apparatus.

Referring particularly to Figure 3, there is provided a low voltage power source P, such as a battery, which is connected by the lead 12 to a microammeter 13 and by the lead 14 to a resistance 15. This resistance is employed to balance the circuit and in the embodiment shown, a one MM ohm resistance is employed with a six volt power supply. The microammeter is connected by the lead 16 to the resistor strip 6 the other end of which is connected by the lead 17 to the resistance 15. A lead line 18 is connected to the lead 16 at a position adjacent to the lower end of the resistor strip 6 and to the lower end of the contactor strip 7. Also connected to the contactor strip 7 is a lead line 19 which is connected at its other end to the millivoltmeter 20. A lead line 21 connects the millivoltmeter 20 with the lead line 17 adjacent the top of the resistor strip 6. It should be noted that when a battery is employed as the power source P, the resistance 15 must be variable so that the microammeter 13 can be kept at a fixed value. However, when an electronic regulator or constant voltage transformer is used, a variable resistor at 15 is not required.

Referring to Figure 1, there is provided a thermocouple head 22 which is positioned outside of the bin 2 and contains the electrical connections to resistor strip and contactor strip positioned inside the bin. It is to be understood, however, that any other suitable housing, or like device, may be employed in the place of the thermocouple head, if desired.

As the level of the polymeric material 3 in the bin changes, due to replacement or removal of the material from the bin, there is a progressive contacting of the leaf spring contactors 8 because of the lateral pressure of the polymeric material thus causing the contactors to come in contact with the resistor strip 6. Assuming that the material in the bin 2 is at such a level as to cause the contactor strip 8a, as shown in Figure 3, to come in contact with the resistor strip 6, the current from the power source P would flow through the leads 12, 16, 18 and then through the contactor strip 7, through the leaf spring contactor 8a to the resistor strip 6 and then through lead line 17, resistor 15 and lead line 14 back to the power source completing the circuit. The portion of the resistor strip 6 below the level of the leaf spring contactor 8a would be in effect shorted out. This would cause the circuit to become unbalanced due to the fact that the amount of resistance in the resistor strip 6 has been reduced. This unbalance in the circuit is recorded on the millivoltmeter 20. The millivoltmeter can be readily calibrated so that the readings thereon, indicating the unbalance in the circuit, are proportional to the depth of the polymeric material in the bin 2.

Thus, by means of the present invention there is provided a device or apparatus which may be readily installed in existing storage bins or containers for indicating the level of powdered material therein. There is no danger of the contactor strip becoming clogged with the powdered material due to the film 9 disposed thereover, and in addition the film 9 also acts as an insulator keeping the powdered material away from the leaf contactor springs thus alleviating the danger of an explosion or fire which may occur should there be a spark when the leaf contactor spring comes into contact with the resistor strip. The present indicating device may be used in containers of any shape or size and may be disposed in any position therein, although it is preferred to install the same in the wall of the container, thus no storage space is taken up by the level indicating device. The indicating device may be of any desired size or length depending upon the particular container with which it is to be employed.

As previously pointed out the present level indicator is particularly adapted to be employed in containers which are sealed from the atmosphere and in which it is impractical to employ a visual means, such as a glass window, to indicate the level of the material therein.

While the contactor strip may be made from any conductive material, it is preferred to use brass. Further, the leaf spring contactors may be made with any amount of spring or resistance therein, which of course will depend upon the weight or the size of the material stored in the container. For all practical purposes, when indicating the level of an acrylonitrile polymeric material stored in a bin, a contactor strip may be used which a load of 5 grams at the center of a unit cantilever will provide contact. This is approximately 0.5 gm./sq. cm.

Many other advantages of the present invention, not hereinbefore pointed out, will be apparent to those skilled in the art.

It is to be understood that changes and variations may be made without departing from the spirit and scope of the invention as defined in the appended claims.

I claim:

1. An apparatus for indicating the level of a solid granular material in a closed container comprising a vertical supporting means, resistor means mounted along the length of the supporting means, a series of leaf spring contacting means integrally attached to each other at one end and mounted in cantilever fashion on the supporting means on said end, said contacting means being arranged in a vertical series along the supporting means with the axes of the contacting means being perpendicular to the axis of the supporting means, the other end of said leaf spring contacting means being adjacent the resistor means, film means positioned over the resistor and contacting means to keep the granular material out of contact therewith, pressure equalizing means positioned adjacent the supporting means, said pressure equalizing means comprising a porous material to allow the passage of gas therethrough to and from the interior of the container and the space formed by the film means and supporting means, and electric circuit means connected to the resistor means and contacting means, said circuit means comprising a resistance measuring means for measuring the variance of resistance in the resistor means caused by the pressure of the granular material on the contacting means forcing the latter into contact with the resistor means.

2. An apparatus as defined in claim 1 wherein the film means is a non-conducting flexible film.

3. An apparatus as defined in claim 1 wherein the supporting means comprises a portion of the wall of the container.

4. An apparatus as defined in claim 1 wherein the pressure equalizing means is a strip of porous material positioned adjacent one edge of the film means and the supporting means and interposed between said film means and supporting means.

5. An apparatus as defined in claim 4 wherein the supporting means comprises a portion of the wall of the container.

6. An apparatus as defined in claim 5 wherein the film means is a non-conducting flexible film.

References Cited in the file of this patent

UNITED STATES PATENTS 2,541,576    Detuno     Feb. 13, 1951

FOREIGN PATENTS 752,158    France     Mar. 9, 1933
825,007    France     Nov. 6, 1936